(12) United States Patent
Long et al.

(10) Patent No.: US 10,135,496 B2
(45) Date of Patent: Nov. 20, 2018

(54) NEAR FIELD, FULL DUPLEX DATA LINK FOR USE IN STATIC AND DYNAMIC RESONANT INDUCTION WIRELESS CHARGING

(71) Applicant: Momentum Dynamics Corporation, Malvern, PA (US)

(72) Inventors: Bruce Richard Long, Malvern, PA (US); Andrew W. Daga, Malvern, PA (US)

(73) Assignee: Momentum Dynamics Corporation, Malvern, PA (US)

( * ) Notice: Subject to any disclaimer, the term of this patent is extended or adjusted under 35 U.S.C. 154(b) by 42 days.

(21) Appl. No.: 15/508,611

(22) PCT Filed: Sep. 4, 2015

(86) PCT No.: PCT/US2015/048521
§ 371 (c)(1),
(2) Date: Mar. 3, 2017

(87) PCT Pub. No.: WO2016/037045
PCT Pub. Date: Mar. 10, 2016

(65) Prior Publication Data
US 2017/0294941 A1    Oct. 12, 2017

Related U.S. Application Data

(60) Provisional application No. 62/046,392, filed on Sep. 5, 2014.

(51) Int. Cl.
*H04B 5/00*    (2006.01)
*H02J 50/10*   (2016.01)
(Continued)

(52) U.S. Cl.
CPC .......... *H04B 5/0031* (2013.01); *H01F 38/14* (2013.01); *H02J 7/025* (2013.01); *H02J 50/10* (2016.02);
(Continued)

(58) Field of Classification Search
CPC . H02J 50/80; H02J 50/10; H02J 7/025; H04B 5/0031; H04B 5/0037; H04B 5/0075; H01F 38/14
See application file for complete search history.

(56) References Cited

U.S. PATENT DOCUMENTS 5,302,954 A    4/1994  Brooks et al.
5,821,731 A *  10/1998 Kuki ................... B60L 11/1805
                                                            320/108
(Continued)

FOREIGN PATENT DOCUMENTS

CN    101213783 A    7/2008
CN    102629775 A    8/2012
(Continued)

OTHER PUBLICATIONS

"Chinese Application Serial No. 201580058034.9, Office Action dated Jan. 30, 2018", 10 pgs.
(Continued)

*Primary Examiner* — Devan A Sandiford
(74) *Attorney, Agent, or Firm* — Schwegman Lundberg & Woessner, P.A.

(57) ABSTRACT

A full duplex, low latency, near field data link controls a static and/or dynamic resonant induction, wireless power transfer system used for recharging electric vehicles and other electrically powered devices. A coherent transponder configuration enables low complexity synchronous detection and positive rejection of signals originating from nearby and adjacent vehicles. A reference crystal oscillator in the
(Continued)

ground side apparatus provides frequency synchronization for both the forward and the return data links. Transmission is by means of near field magnetic induction between pairs of loop antennas which, together with the effective waveguide below cutoff structure comprised by the vehicle underbody and the ground surface, largely restrict signal propagation to the area in the immediate vicinity of the system antennas.

47 Claims, 7 Drawing Sheets

(51) Int. Cl.
| | |
|---|---|
| *H02J 7/02* | (2016.01) |
| *H01F 38/14* | (2006.01) |
| *H02J 50/80* | (2016.01) |
| *H04B 1/30* | (2006.01) |

(52) U.S. Cl.
CPC ............... *H02J 50/80* (2016.02); *H04B 1/30* (2013.01); *H04B 5/0037* (2013.01); *H04B 5/0075* (2013.01)

(56) References Cited

U.S. PATENT DOCUMENTS

| | | | | |
|---|---|---|---|---|
| 9,866,068 | B2 * | 1/2018 | Yamakawa | ............... H01F 3/10 |
| 2004/0036626 | A1 * | 2/2004 | Chan | ................... A01K 11/006 |
| | | | | 340/870.17 |
| 2010/0052869 | A1 | 3/2010 | Stewart | |
| 2011/0248754 | A1 * | 10/2011 | Neumann | ............... H03J 1/005 |
| | | | | 327/156 |
| 2011/0285349 | A1 * | 11/2011 | Widmer | ................ B60L 11/182 |
| | | | | 320/108 |
| 2012/0001593 | A1 * | 1/2012 | Di Guardo | ............. H02J 7/025 |
| | | | | 320/108 |
| 2012/0155344 | A1 * | 6/2012 | Wiley | ..................... H02J 7/025 |
| | | | | 370/310 |
| 2013/0015707 | A1 | 1/2013 | Redmann | |
| 2013/0099584 | A1 | 4/2013 | Von Novak, III | |
| 2013/0154552 | A1 * | 6/2013 | Siessegger | ............ H02J 7/0047 |
| | | | | 320/108 |
| 2015/0042168 | A1 * | 2/2015 | Widmer | .............. B60L 11/1829 |
| | | | | 307/104 |
| 2015/0084587 | A1 * | 3/2015 | Kato | ....................... H02J 50/80 |
| | | | | 320/108 |
| 2015/0260835 | A1 * | 9/2015 | Widmer | .................. G01S 13/04 |
| | | | | 342/27 |

FOREIGN PATENT DOCUMENTS

| | | | |
|---|---|---|---|
| CN | 102947124 A | 2/2013 | |
| CN | 107112123 A | 8/2017 | |
| EP | 0681199 A2 * | 11/1995 | ............ B82Y 20/00 |
| GB | 1166841 A | 10/1969 | |
| GB | 2497824 A * | 6/2013 | ............. B60L 5/005 |
| JP | 2017536068 A | 11/2017 | |
| WO | WO-2016037045 A1 | 3/2016 | |

OTHER PUBLICATIONS

"Chinese Application Serial No. 201580058034.9, Response filed Mar. 20, 2018 to Office Action dated Jan. 30, 2018", w/trans claims.
"European Office Action Serial No. 15838022.0, Response filed Oct. 20, 2017 to Office Action dated Apr. 12, 2017", 33 pgs.
"International Application Serial No. PCT/US2015/048521, International Preliminary Report on Patentability dated Mar. 16, 2017", 8 pgs.
"International Application Serial No. PCT/US2015/048521, International Search Report dated Jan. 29, 2016", 4 pgs.
"International Application Serial No. PCT/US2015/048521, Invitation to Pay Additional Fees dated Nov. 4, 2015", 2 pgs.
"International Application Serial No. PCT/US2015/048521, Written Opinion dated Jan. 29, 2016", 6 pgs.
"European Application Serial No. 15838022.0, Partial Supplementary European Search Report dated Jul. 24, 2018", 22 pgs.

\* cited by examiner

NEAR FIELD, FULL DUPLEX DATA LINK FOR USE IN STATIC AND DYNAMIC RESONANT INDUCTION WIRELESS CHARGING

CROSS-REFERENCE TO RELATED APPLICATIONS

The present application is a National Stage Application filed under 35 U.S.C. 371 of International Application No. PCT/US2015/048521, filed Sep. 4, 2015, which claims priority to U.S. Provisional Patent Application No. 62/046,392, filed on Sep. 5, 2014. The contents of that application are hereby incorporated by reference.

TECHNICAL FIELD

The invention describes a full duplex, near field data link intended for control of a resonant induction, wireless power transfer system used for recharging electric vehicles in an exemplary embodiment. The invention uses a coherent transponder configuration that enables interference rejecting synchronous detection and positive rejection of signals originating from nearby and adjacent vehicles.

BACKGROUND

Inductive power transmission has many important applications spanning many industries and markets. Resonant induction wireless power apparatus can be viewed as a switch mode DC-to-DC power supply having a large air gap transformer separating and isolating the power supply input and output sections. Because the output current is controlled by adjustment of the input side parameters, there must be a way to communicate the output parameters to the input side control circuitry. Conventional, isolated, switch mode power supplies use opto-couplers or coupling transformers to communicate across the isolation barrier but these conventional methods are not useful in the presence of a large physical gap. Acoustic and optical communications across the power transfer gap are possible in principle but are inadequate in practice when challenged by mud, road debris, snow and ice as well as standing water. It is possible to communicate across the power transfer gap by means of modulating the receiving inductor impedance and detecting the voltage and current variations induced on the primary side inductor. However, because of the generally low operating frequency employed by the resonant induction wireless power transfer apparatus and the moderate to high loaded Q of the primary and secondary side inductors of such resonant induction wireless power transfer systems, available data communications bandwidth is severely constrained and full duplex communications implementation is difficult.

Radio frequency based data communications systems are therefore preferred as they are immune to the difficulties listed above; however, conventional radio frequency data communications systems are inadequate in several aspects. Half-duplex systems transmit only in one direction but rapidly alternate the direction of transmission, thereby creating a data link that functions as a full duplex link. Transmission data buffering or queuing introduces significant and variable transmission latency which is especially undesirable as a cause of control system instability when placed in the control system feedback path.

Conventional super-heterodyne receivers generally require rather good intermediate frequency filters to provide off-channel interference rejection. However, such filters tend to be expensive and do not easily lend themselves to monolithic integration.

Furthermore, conventional radio data links do not intrinsically discriminate against other nearby data links of the same type. This means that conventional radio based data links when employed to mediate wireless charging of electric vehicles often respond to the radio commands emitted by charging apparatus in nearby or adjacent parking slots, a behavior that greatly complicates unambiguous vehicle identification and subsequent wireless charging control.

For the safe operation of high power wireless charging, it is highly desirable to provide a communications link with minimum latency to provide safe, fast shutdown in the event of loss of load. For the safe and practical operation of wireless power transmission devices, it is also desirable that the communications link be inherently discriminatory so that there is minimized risk of crosstalk or misread communication between adjacent devices or vehicles. The communications link should be able, during operation, to assure that one vehicle communicates with only one designated ground station and no other vehicle or ground station once communications is established.

SUMMARY

The invention addresses the above needs and the limitations of the prior art by implementing a coherent, full-duplex radio frequency data link that relies upon near field inductive coupling as opposed to far field propagation as in conventional systems to restrict effective communication range, that employs synchronous detection to reject off channel and some co-channel interference without sophisticated frequency domain filtering, and that employs a coherent transponder architecture for positive identification of data link transmission-reception equipment pairs. As used herein, "coherent" means that the respective frequencies are related to each other exactly by a ratio M/N where M and N are integers. In other words, a period of time containing M integer cycles of the first frequency contains exactly N integer cycles of the second frequency.

In exemplary embodiments of the invention, two apparatuses are provided, one associated with the ground side wireless power transmission equipment, and another associated with the vehicle side wireless power reception equipment. A crystal controlled reference oscillator located in the ground side apparatus provides a common basis for the coherent generation of all radio frequency signals needed for transmission and for detection. As this is a full duplex communication apparatus, there are two independent transmission-reception links: a forward link from the ground side to the vehicle side apparatus, and a return link from the vehicle side to the ground side apparatus. The vehicle side loop antennas are typically located below the conductive underbody of the vehicle and are parallel with respect to the ground surface. In exemplary embodiments, the forward and return inductive links are multiplexed onto wireless power transfer coils of the vehicle side and ground side wireless power transmission equipment.

The forward link transmission signal is derived from the reference oscillator. Serial data is imposed upon the forward link carrier by the modulator. Transmission occurs between two electrically small loop antennas having significant mutual induction coupling that are separated by much less than a wavelength at the forward link operating frequency. On the vehicle side of the forward link, the received signal is detected by a homodyne detector that extracts the carrier of the signal and uses it as a detection reference in a synchronous detector. The extracted carrier is used as a frequency reference for the return link carrier with the return link data imposed upon the carrier with a second modulator. The return link carrier is thus coherent with the forward link carrier but multiplied in frequency. Return link transmission occurs by near field, inductive coupling between two closely spaced, electrically small loop antennas as before. Multiple return path data channels, each return path data channel transmitting data at a different M/N multiple of the transmission frequency of the first inductive link, where M and N are integers, may also be used. A synchronous detector on the ground side of the link extracts the return link data using a frequency multiplied version of the original reference oscillator signal as the detection reference. Link modulation in both directions can be amplitude modulation, frequency modulation, phase modulation, or a combination thereof.

Because the forward link carrier, the forward link detection reference, the return link carrier, and the return link detection reference are all derived from the same primary side reference oscillator, coherency of these four critical signals is assured by design. Complex frequency acquisition and synchronization circuitry is not required. Harmonic cancellation circuitry may be used in order to avoid self-interference between signals on the forward and return communication links. Furthermore, production tolerance and environmentally induced frequency variations between reference oscillators insures that the link signals from apparatus located in adjacent parking spaces will not be coherent and therefore will not be subject to synchronous detection. Further rejection of link signals originating from apparatus and vehicles in adjacent parking slots arises from attenuation that results when the link transmission wavelength exceeds the vehicle underbody to ground surface separation distance with the vehicle underbody and the ground surface functioning as the two plates of a waveguide operating below the guide propagation cutoff frequency.

In an exemplary embodiment, a system and associated method are provided for providing full duplex data communication employing near field inductive transmission between a first transmit/receive system and a second transmit/receive system. The method includes the steps of the first transmit/receive system transmitting a first signal over a first inductive link, the second transmit/receive system receiving the first signal over the first inductive link, the second transmit/receive system transmitting a second signal over a second inductive link, and the first transmit/receive system receiving the second signal over the second inductive link, where the second signals are derived from the first signals and the first and second signals are frequency coherent. The first and second signals are frequency synchronized and the frequencies of the first and second signals are related by a ratio M/N where M and N are both integers. In exemplary embodiments, the first and second signals have an integer harmonic relationship with each other, where the integer is not equal to 1. Thus the first and second signals have an exact integer or an exact rational fraction frequency relationship with each other.

The methods described herein also include methods for wireless charging a vehicle using a wireless inductive power transfer system by establishing a full duplex communication link between the vehicle and a charging station, where the full duplex communication link employs near field inductive transmission between a first transmit/receive system at the charging station and a second transmit/receive system on the vehicle. In an exemplary embodiment, the full duplex communication link includes the first transmit/receive system transmitting a first signal over a first inductive link, the second transmit/receive system receiving the first signal over the first inductive link, the second transmit/receive system transmitting a second signal over a second inductive link, and the first transmit/receive system receiving the second signal over the second inductive link, where the second signals are derived from the first signals and the first and second signals are frequency coherent. Wireless power transfer between the charging station and the vehicle is then controlled by sending control signals over the full-duplex communication link. The communication link may be initiated when the charging station detects a change caused by an overhead vehicle in impedance or mutual impedance between isolated electromagnetic elements of a wireless power transfer coil, alignment coils, and/or a near field communications antenna of the charging station. Transmission of the control signals over the first inducting link is initiated when the inductance change is detected.

The communication system described herein also may be adapted to provide dynamic wireless charging of a moving vehicle using a wireless inductive power transfer system including a plurality of charging stations installed in a roadway. Such a method includes establishing a full duplex communication link between the vehicle and a first charging station, where the full duplex communication link employs frequency coherent near field inductive transmission between a first transmit/receive system at the first charging station and a second transmit/receive system on the vehicle. During operation, the first charging station and/or a vehicle transmitter provides location, timing, and/or speed information regarding the vehicle to a second charging station, which uses the location, timing, and/or speed information to determine a time when the vehicle's wireless charging receiving device will be positioned over the second charging station. The second charging station provides wireless power transfer at the determined time to provide wireless power transfer to the vehicle, whereby the vehicle is charged as the vehicle passes over the plurality of charging stations. In an exemplary embodiment, a pre-sequence firing procedure establishes a traveling wave of magnetic energy that moves at the same rate as the vehicle's wireless charging receiving device.

DETAILED DESCRIPTION OF THE DRAWINGS

The foregoing and other beneficial features and advantages of the invention will become apparent from the following detailed description in connection with the attached figures, of which.

DETAILED DESCRIPTION OF ILLUSTRATIVE EMBODIMENTS

An exemplary embodiment of the invention will be described with respect to FIGS. 1-9 for use in charging electrically powered vehicles, although those skilled in the art will appreciate that the teachings provided herein may be used in other non-vehicular resonant magnetic induction wireless power transfer systems. Such embodiments are intended to be within the scope of the present disclosure.

Figure 1:
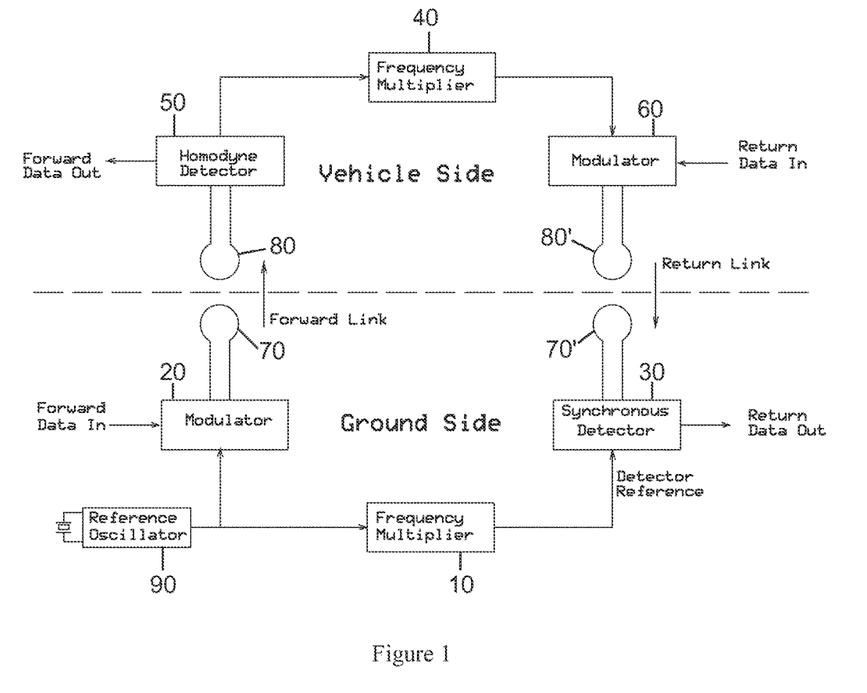
FIG. 1 shows a conceptual representation of the invention.

FIG. 1 illustrates a conceptual representation of the invention wherein two apparatuses are provided, a ground side apparatus associated with the ground side wireless power transmission equipment, and a vehicle side apparatus associated with the vehicle side wireless power reception equipment. The data link illustrated in FIG. 1 may, for example, be implemented in the coil alignment error detecting apparatus described in U.S. Provisional Patent Application No. 61/682,572, filed Aug. 6, 2013, the wireless power transfer coils, or on the near field communication antenna. As shown in FIG. 1, the ground side apparatus includes a frequency multiplier 10, a data modulator 20 that receives input data for transmission, and a synchronous detector 30 that receives data on a return link from the vehicle side apparatus and provides output data. Similarly, the vehicle side apparatus includes a frequency multiplier 40, a homodyne detector 50 that receives data on a forward link from the ground side apparatus, and a modulator 60 that transmits data on the return link to the ground side apparatus. Loop antennas 70 and 70' of the ground side apparatus communicate wirelessly by induction with loop antennas 80 and 80' on the vehicle side apparatus in a conventional manner. A crystal controlled reference oscillator 90 located in the ground side apparatus provides a common basis for the coherent generation of all radio frequency signals needed for transmission and for detection. As noted above, "coherent" as used herein means that the respective frequencies are related to each other exactly by a ratio M/N where M and N are integers. As this is a full duplex communication apparatus, there are two independent transmission-reception links: a forward link from the ground side to the vehicle side apparatus, and a return link from the vehicle side to the ground side apparatus. The vehicle side loop antennas 80 and 80' are typically located below the conductive underbody of the vehicle and are parallel with respect to the ground side loop antennas 70 and 70'.

The invention described herein and shown in FIG. 1 departs from conventional radio data communications as follows:

The communications path is full duplex and bi-directional having a forward path from the ground side apparatus to the vehicle side apparatus and a second return data path originating with the vehicle side apparatus sending data to the ground side apparatus.

The electronic communication mechanism is near field, magnetic field coupling between two antennas 70, 80 and 70', 80' sensitive to impinging magnetic field energy, rather than far field, free space propagation of conventional practice radio frequency data communications.

The forward path signal carrier provides the reference frequency for the generation of the return path signal by means of frequency multiplication. This means that the return path signal is coherent with the forward path signal and the technical difficulty of deriving a synchronous and coherent reference signal for return path synchronous detection is avoided. Furthermore, the coherent forward and return path signals make possible simple, unambiguous rejection of co-channel and off channel-interference and rejection of data link signals originating from other identical apparatus in adjacent parking slots.

Figure 2:
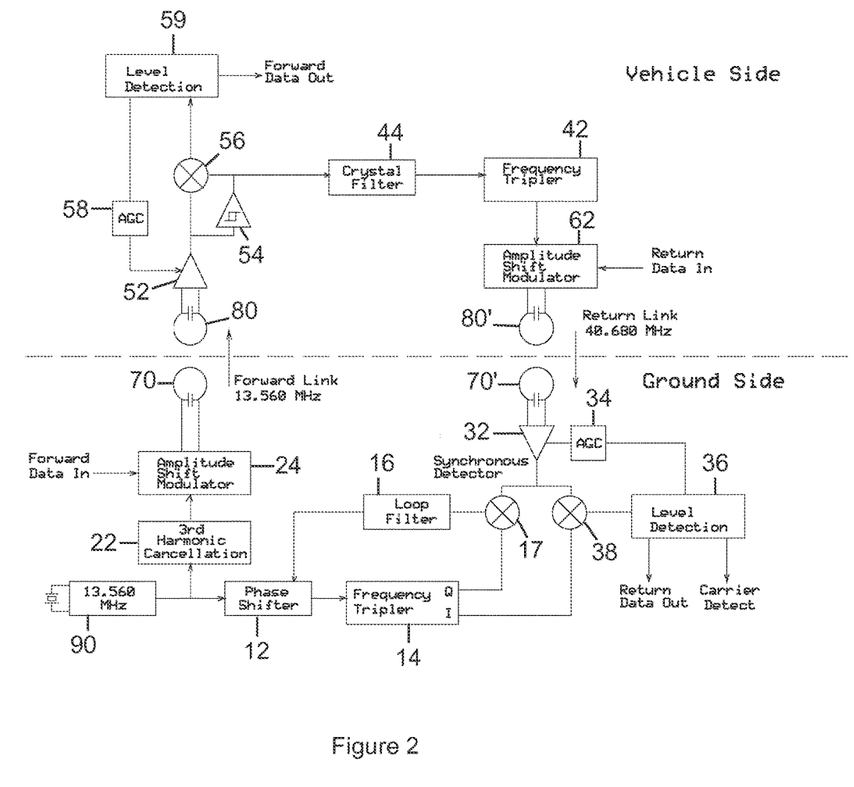
FIG. 2 shows an illustrative embodiment of the invention.

In the exemplary embodiment shown in FIG. 2, the forward path frequency from reference oscillator 90 is 13.560 MHz. The return path operates on the third harmonic of the forward path (M/N=3), 40.680 MHz. Both frequencies are internationally allocated for non-communications Industrial, Scientific and Medical (ISM) use. Communications use is also permitted in ISM channels with reduced regulatory requirements but must accept interference from all other ISM channel users. The non-radiating, near field nature of the coherent transponder system described herein along with the waveguide below cutoff structure comprised by the vehicle conductive underbody and the ground surface in a typical application makes the described system very tolerant of co-channel interference and for this reason is well suited for use on ISM assigned frequencies.

The forward path signal generation begins with reference quartz crystal oscillator 90 operating at a frequency of 13.560 MHz. This signal is applied to a waveform generation stage including $3^{rd}$ harmonic cancellation circuit 22 and amplitude shift modulator 24 that together comprise the modulator 20 of FIG. 1. Of course, other types of modulators, such as frequency shift modulators, QPSK modulators, and the like may be used. In the exemplary embodiment, amplitude shift modulator 24 generates the rectangular waveform shown in FIG. 3 where T is the waveform period and the $3^{rd}$ harmonic power is approximately zero. A small loop antenna 70 with a balanced feed serves as the forward path transmit antenna, while a second, vehicle mounted, balanced feed, small loop antenna 80 is used for the forward path receive antenna. Both antennas 70, 80 are much smaller than a wavelength at the operating frequency and for this reason are poor free-space radiators. However, when in close physical proximity, the two small loop antennas 70, 80 have significant mutual magnetic field coupling that enables both forward and reverse communications paths without significant free space propagation.

Figure 3:
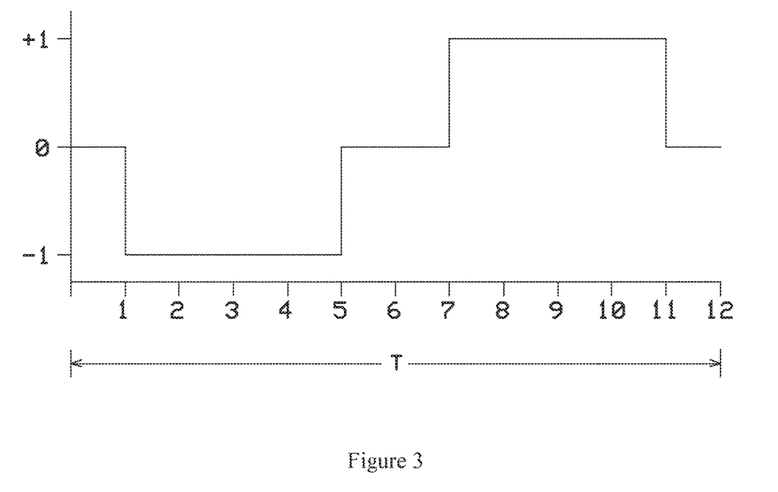
FIG. 3 shows the low harmonic waveform employed by an illustrative embodiment to avoid self-interference.
Figure 4:
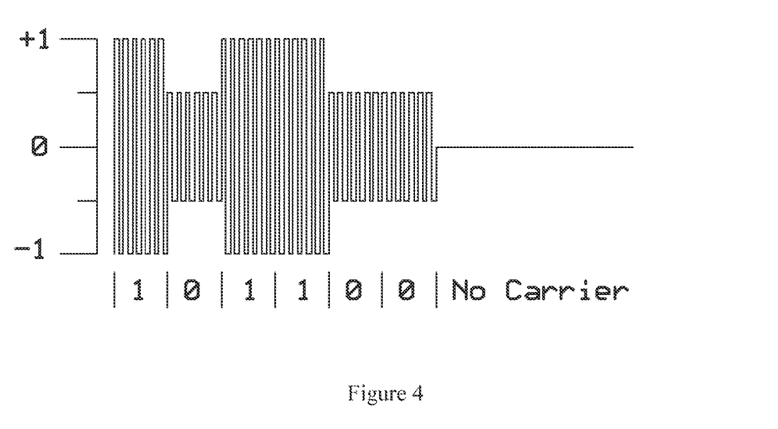
FIG. 4 shows a representation of digital amplitude shift modulation used by an illustrative embodiment of the invention.

From the "Engineering Mathematics Handbook, Third Edition, Tuma, Jan J., McGraw-Hill 1987 ISBN 0-07-065443-3, the Fourier series coefficients for the modified sine waveform shown in FIG. 3 are given by:

$$\beta_n = \frac{4\mathrm{Sin}\frac{n}{3}\pi \mathrm{Sin}\frac{n}{2}\pi}{n\pi}$$

Of the first twenty Fourier series coefficients, all but six are zero. The non-zero coefficients are the $5^{th}$ and $7^{th}$, which are suppressed −14 dB and −16.9 dB, the $11^{th}$ and $13^{th}$ which are suppressed −20.8 dB and −22.3 dB, and the $17^{th}$ and $19^{th}$ which are suppressed −22.9 and −25.5 dB with respect to the desired n=1 component. While a mathematically ideal waveform has infinite third harmonic suppression, a practical implementation will have less than infinite harmonic cancellation due to non-equal 0-1 and 1-0 logic propagation delays and from other small waveform asymmetries. Even so, the waveform of FIG. 3 generated by the $3^{rd}$ harmonic cancellation circuit 22 with the circuit shown in FIG. 5 has excellent third harmonic suppression ($3^{rd}$ harmonic energy approaching zero), a highly desirable feature to avoid self-interference between the third harmonic of the forward transmission path and detection of the 40.680 MHz return path. Remaining residual third harmonic energy can be further suppressed, if necessary, using conventional harmonic filtering techniques.

Figure 5:
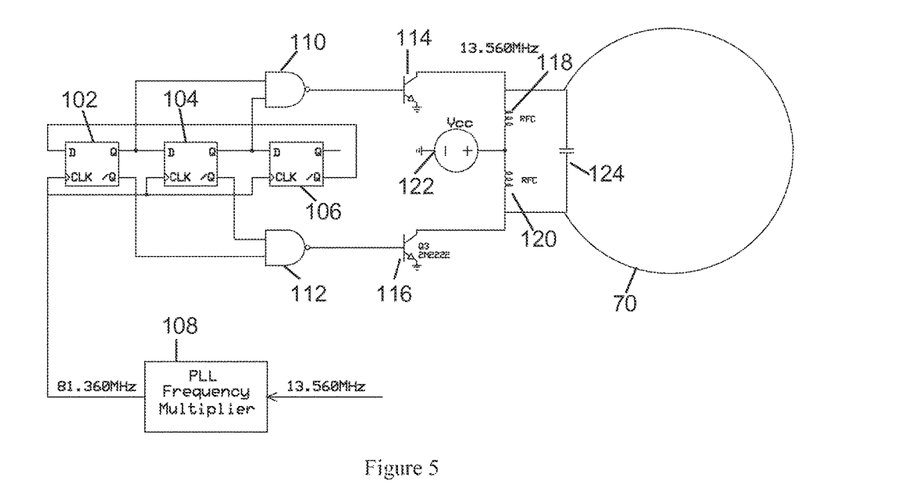
FIG. 5 shows an embodiment of the low harmonic generation circuit that produces the waveform shown in FIG. 3.

The low third harmonic generation circuit shown in FIG. 5 includes a walking ring counter comprised of three D flip-flops 102, 104, 106 clocked at six times the desired output frequency as derived from the 13.560 MHz frequency from the reference oscillator 90 by PLL frequency multiplier 108. A pair of logic (NAND) gates 110, 112 decodes the walking ring counter to produce the desired rectangular wave that drives the forward link loop antenna 70 by means of two transistors 114, 116 arranged in a symmetrical, push-pull configuration. The inductance of the two radio frequency chokes 118, 120 connected to voltage source 122, combined with the inductance of the loop antenna 70 and the antenna resonating capacitor 124 shown in FIG. 5, constitute a resonant circuit that provides suppression of residual harmonic energy, particularly third harmonics in the illustrated embodiment.

As shown in FIG. 2, in an exemplary embodiment amplitude shift keying (ASK) modulation is imposed upon the forward link carrier by amplitude shift modulator 24 by varying the value of the forward link transmitting stage supply voltage. Logic one bits are encoded as full signal amplitude with the transmitting stage operating from full supply voltage. Logic zero bits are encoded as one half of the full signal amplitude with the transmitting stage operating with a reduced supply voltage. Varying the transmitter stage supply voltage in this fashion produces the transmission waveform shown in FIG. 4.

On the vehicle side of the forward link, a variable gain controlled amplifier 52 increases received signal amplitude from loop antenna 80. Since the received signal has non-zero values even for logic zero bits, the 13.56 MHz carrier is always present (see FIG. 4). A portion of the amplified, received signal is applied to a limiting amplifier 54 that removes received signal amplitude variations, both those introduced by amplitude data modulation and those occurring due to incidental changes in the magnetic field coupling between the two forward path loop antennas 70, 80. The output of the limiting amplifier 54 is a constant amplitude square wave that indicates the instantaneous polarity of the received signal. The portion of the variable gain amplifier 52 output not applied to the limiting amplifier 54 is applied to one input of the multiplicative mixer 56. The limiting amplifier 54 output drives the other mixer input. The limiting amplifier 54 and the mixer 56 comprise the homodyne detector 50 in which the incoming signal carrier is extracted and used to synchronously detect the incoming signal. The propagation delay of the limiting amplifier 54 must be negligible or compensated for to achieve the full advantages of coherent detection. The output of the homodyne detector 50 is equivalent to full wave rectification of the incoming amplitude modulated signal. Resistor-capacitor low pass filtering removes the twice carrier frequency ripple leaving a direct current voltage that varies amplitude according to the impressed serial digital modulation. The carrier ripple filtered, post-homodyne detector signal is applied to a level detection circuit 59 that feeds the AGC control loop 58 and that also extracts the forward path serial data by means of amplitude level detection. Its implementation will be described in greater detail below with respect to FIG. 7.

The forward path carrier recovered by the limiting amplifier 54 is applied to a frequency tripler 42 implemented as a pulse generator followed by a filter or equivalently by a phase locked loop after first having passed through a crystal filter 44 that prohibits frequency multiplier operation except in the presence of a sufficiently strong forward link signal, thus avoiding conflicting frequencies. The resulting 40.680 MHz carrier is applied to a second amplitude shift modulator 62 using 100% and 50% modulations levels as before to encode serial, digital data on the return data path. The return path amplitude shift modulator 62 drives a small, resonant loop antenna 80' as before except that harmonic emission cancellation elements 102-112 of FIG. 5 are not needed.

Figure 6:
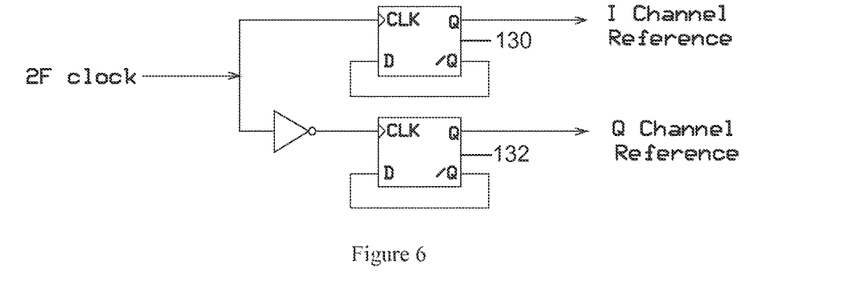
FIG. 6 shows a representation of digital amplitude shift modulation used by an illustrative embodiment of the invention.

On the ground side of the return link, there is a small resonant loop receiving antenna 70' and an amplifier 32 controlled by AGC circuit 34. Amplifier 32 and mixers 17 and 38 together with frequency tripler 14 form synchronous detector 30. Synchronous detection of the received return path signal is implemented by generating a 40.680 MHz synchronous detection reference signal by means of frequency tripling. While the frequency error of the synchronous detection reference signal is guaranteed to be zero by the overall design of the apparatus, zero phase error is not assured and is obtained through the use of quadrature channel phase detection and phase lock loop control of a phase shifter stage. Putting the phase shift stage (phase shifter 12) before rather than after frequency tripler 14 means total phase shift control range need only exceed 120 degrees rather than the full 360 degrees required at the synchronous detector 30 to insure phase synchronous detection. To ease the quadrature reference signal generation at 40.680 MHz, the ground side 13.560 MHz signal from the crystal oscillator 90 is multiplied by frequency tripler 14 which outputs two square waves offset by 90°. The frequency tripler 14 is implemented by a factor of six phase locked loop frequency multiplier followed by a quadrature divide-by-two circuit as shown in FIG. 6 including D flip-flops 130, 132 to obtain I and Q synchronous detection reference signals. It will be appreciated that when the Q channel signal output at 17 equals 0 V then there is no phase error. However, if the output at 17 is not 0 V, then there is phase error and the phase lock loop operation of phase shifter 12 functions to drive the phase difference to zero.

The variable phase shift circuit 12 is implemented as a series of capacitively loaded, logic inverters with variable supply voltage. The capacitive loading increases the propagation delay from inverter input to inverter output. Increased supply voltage decreases inverter propagation delay, thereby reducing inverter phase shift. A conventional phase locked loop comprised by the Q channel mixer 17 and associated loop filter 16 drives Q channel output of the synchronous detector 30 to zero thereby insuring proper phase synchronization for the I channel amplitude detection.

The I channel mixer 38 of the synchronous detector 30 mixes the output of amplifier 32 with the I channel output of frequency tripler 14, thereby providing the amplitude input signal for the level detection circuit 36. Return path, level detection circuit 36 is identical to the forward path, level detection circuit 59 with the exception that the former includes the carrier detection function and associated voltage comparator 138 (FIG. 7) which detects the presence of the return patch signal.

Figure 7:
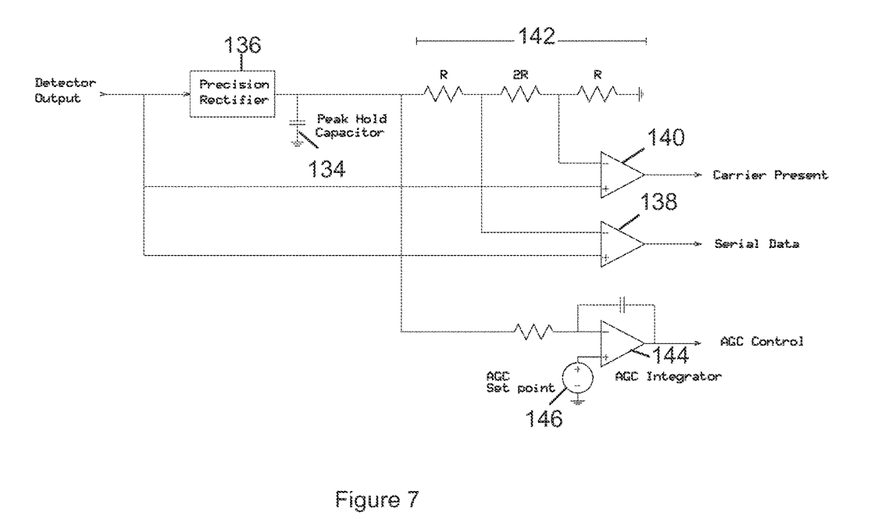
FIG. 7 shows an embodiment of the receiver level detection circuits.

FIG. 7 shows an embodiment of the receiver level detection circuit 36. A peak hold capacitor 134 driven by a full wave precision rectifier 136 holds the maximum detected voltage level which, in turn, is held to a constant value by the automatic gain control (AGC) circuit 34 (FIG. 2). The AGC amplitude stabilized, peak detected voltage provides the reference voltage for the 1-0 serial, binary detection voltage comparator 138 and the reference voltage for the carrier detection voltage comparator 140 by means of a R-2R-R resistor voltage divider 142 that sets the voltage comparator reference voltages at 25% and 75% respectively of the peak value of the post detection waveform shown in FIG. 4. The carrier detection voltage comparator 140 provides fast indication of vehicle side fault occurrence. If a fault occurs on the vehicle side, such as sudden unexpected load shedding, the return link carrier is disabled immediately. The ground side apparatus detects the carrier removal delayed only by pre- and post-detection filter delay and immediately halts wireless power transfer. The full value of the peak hold function is applied to the AGC integrator 144 that adjusts the AGC loop voltage and thus the gain of amplifier 32 to maintain the peak hold capacitor 134 voltage equal to the AGC set point 146 voltage. The conventional precision rectifier 136 generates an output voltage proportional to the absolute value of the input voltage and consists of one or more small signal diodes placed within an op-amp feedback path, a configuration that effectively cancels the diode forward voltage drop thereby enabling precision rectification of low level signals with minimal error.

Alternatively, return link synchronous detection can be made by making use of a coherent, but not phase synchronized, I and Q detection channels. Amplitude and phase modulation can be extracted in the conventional fashion where amplitude is the root mean square of the I and Q channels and the phase angle is the arctangent of the ratio of I and Q. In this alternative embodiment, the phase shifting and phase control loop circuitry is not needed.

FIGS. 1 and 2 show four loop antennas: a sending and a receiving antenna pair 70, 80 for the forward link and a second pair of antennas 70', 80' for the return link. In an alternative embodiment, the forward and return link antenna pair can be consolidated into a single loop antenna with a conventional antenna duplexer to separate and isolate the forward and return link signals. Likewise, it is also possible to multiplex one or both data link signals onto the wireless power transfer coils or onto auxiliary electromagnetic structures such as the eddy current generation coils that are part of the coil alignment error detecting apparatus described in U.S. Provisional Patent Application No. 61/682,572.

For reasons of simplicity and cost reduction it is desirable that the forward and reverse paths share a common antenna structure. The problem then is the combination and subsequent separation of the forward path and the reverse path signal from each other and from other electrical signals encountered by combining functionality into a single antenna structure. In general, there are two general methods to implement signal combination, separation and routing. The first method uses hybrid transformers, hybrid couplers, or directional couplers which distinguish between forward and reverse path signals by means of signal flow direction. The second method relies upon frequency selective filters that distinguish between signals on the basis of frequency. A frequency selective multiplexer can be implemented with LC lumped components, with distributed components or as a monolithic circuit containing a plurality of resonant elements and coupling elements. A frequency multiplexing functional block may combine both signal direction and signal frequency discrimination.

Figure 8:
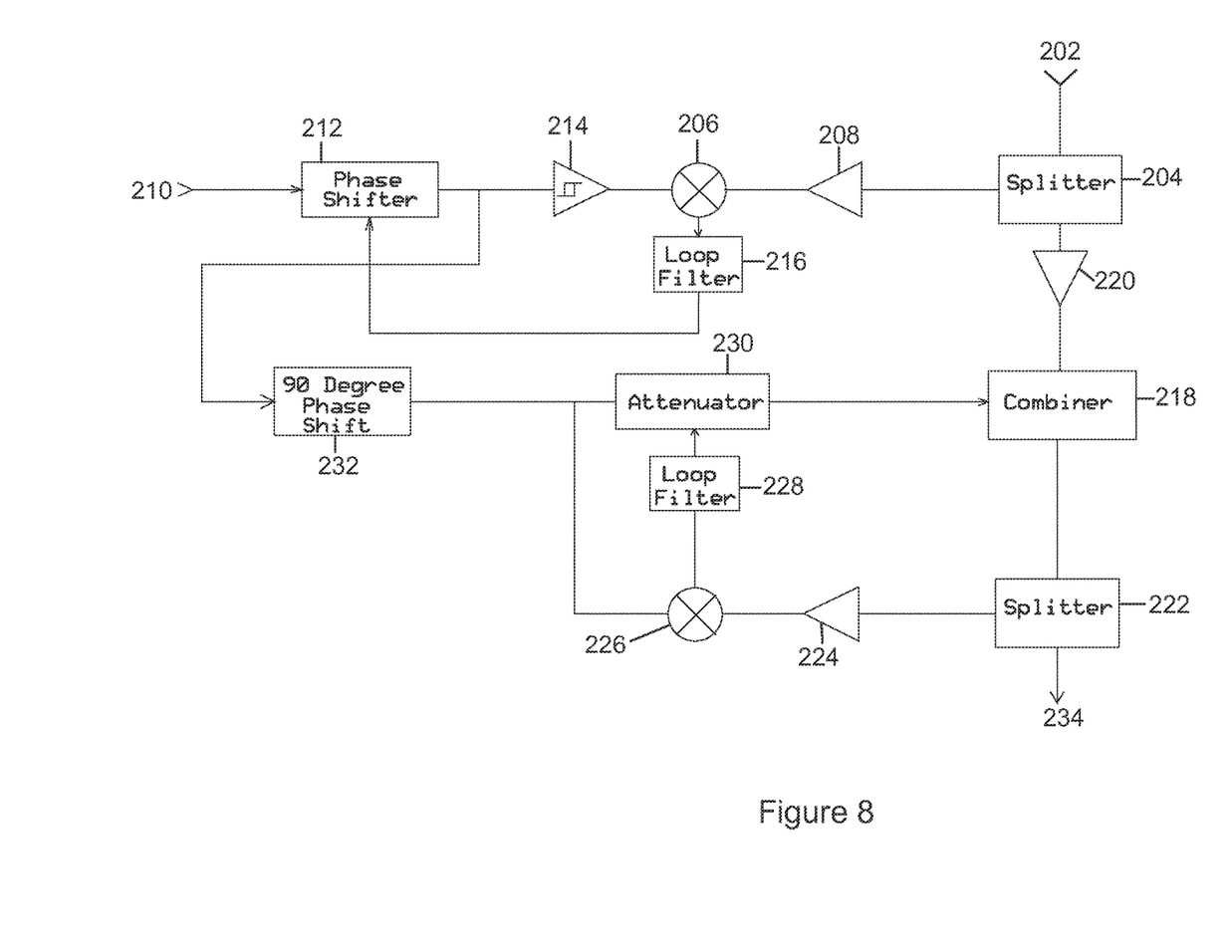
FIG. 8 shows an embodiment of an apparatus for self-interference cancellation.

The performance of a signal multiplexer functional block (circuit) can be enhanced by the addition of electronic signal cancellation as shown in FIG. 8. The electronic signal cancellation functional block (circuit) is placed in the path between the common forward/reverse path antenna and the receiver. The common antenna is connected to port 202 of signal splitter 204. One splitter output goes to the input port of mixer 206 by means of isolation amplifier 208. A sample of the signal to be cancelled is applied to port 210, and the applied signal is shifted in phase by variable phase shifter 212 and applied to the local oscillator port of mixer 206 by means of limiting amplifier 214. The mixer 206 output is applied to a loop filter 216 and then applied to the control port of the variable phase shifter 212. Components 212, 214, 206, and 216 constitute a phase control loop that insures the cancellation signal is 90 degrees out of phase with the unwanted signal component applied to port 202. Zero phase error corresponds to zero direct current voltage at the output of mixer 206.

As illustrated in FIG. 8, a second output of splitter 204 goes to combiner 218 by means of isolation amplifier 220. As illustrated, signal combiner 218, splitter 222, isolation amplifier 224, mixer 226, loop filter 228, and attenuator 230 together constitute an amplitude control loop. A portion of the quadrature sample signal output by phase shifter 212 is applied to the fixed 90 degree phase shifter 232 creating a 180 degree out-of-phase version of the cancellation signal, which passes through controlled attenuator 230 and into signal combiner 218, where if the cancellation signal amplitude is correct, complete cancellation of the unwanted signal is accomplished. One portion of the combiner 218 output signal is directed to the receiver input at 234 via splitter 222. Another portion is directed through isolation amplifier 224 to the signal port of mixer 226 which serves as a coherent amplitude detector driven by an un-attenuated portion of the 180 degree out-of-phase cancellation signal. The output of mixer 226 is passed through loop filter 228 that controls the variable attenuator 230. Those skilled in the art will appreciate that zero cancellation signal amplitude error corresponds to zero direct current voltage at the output of mixer 226.

In operation, as a vehicle approaches a wireless charging station, communications is established before charging commences. Once charging commences, the full-duplex communications is used to mediate and to control multiple aspects of the wireless power transfer operation including transferred power level, output voltage and current, as well as monitoring of proper system operation. To establish control communications, the ground equipment can continuously or periodically emit a forward path signal while listening for a vehicle generated return path signal. Duplex communication is initiated upon detection of a vehicle generated return path signal. Alternatively, the vehicle side electronics can make initial contact with a return path signal temporarily derived from a temporary crystal oscillator (not shown) instead of the normally used carrier recovered by the homodyne detector 50, and non-coherently detected by the ground side electronics. Upon ground side reception of the vehicle signal, the ground side equipment emits a forward path signal. In the case of vehicle side communication initiation, the vehicle side apparatus disables the temporary crystal oscillator and reverts to coherent transponder operation upon successful homodyne detection and carrier recovery.

Both initiation methods described above rely upon the emission of a forward or a return path signal. Communications can also be advantageously initiated with no forward or reverse path emissions. In an exemplary embodiment, the ground equipment detects the change caused by an overhead vehicle in the impedance of the wireless power transfer coil and responds by emitting a forward path signal. This embodiment reduces or eliminates unnecessary signal emissions and is advantageous in some regulatory environments.

In addition to the wireless power transfer coils, the initiating impedance change can also be detected in the coil alignment auxiliary coils or in the near field communications antenna. In addition to impedance change, changes in mutual impedance between isolated electromagnetic elements can also be used to initiate communications.

In the exemplary embodiment described herein, the reverse signal at 40.680 MHz is a simple integer multiple of the forward signal frequency at 13.560 MHz with both signals falling within existing, internationally designated ISM—Industrial, Scientific Medical—frequency assignments. Other frequencies and frequency pairs with non-integer frequency ratios can be used as well. For example, the two international ISM frequency bands with center frequencies of 2450 MHz and 5800 MHz may also be used. The coherent transponder architecture described herein combined with conventional phase locked loop techniques can generate a 5800 MHz signal that is frequency synchronized with a 2450 MHz signal with a frequency ratio M/N of 116/49, where M=5800 MHz and N=2450 MHz. Other combinations of ISM bands and non-ISM band frequencies, frequency pairs with other integer or rational fraction frequency and multiple simultaneous transmission and reception carrier frequencies are also possible. For example, multiple return path data channels, each return path data channel transmitting data at a different M/N multiple of the transmission frequency of the first inductive link, where M and N are integers, may also be used. Full duplex, frequency coherent communications is also possible with the ground and the remote apparatus linked by far field as opposed to near field propagation.

Dynamic Charging

Figure 9:
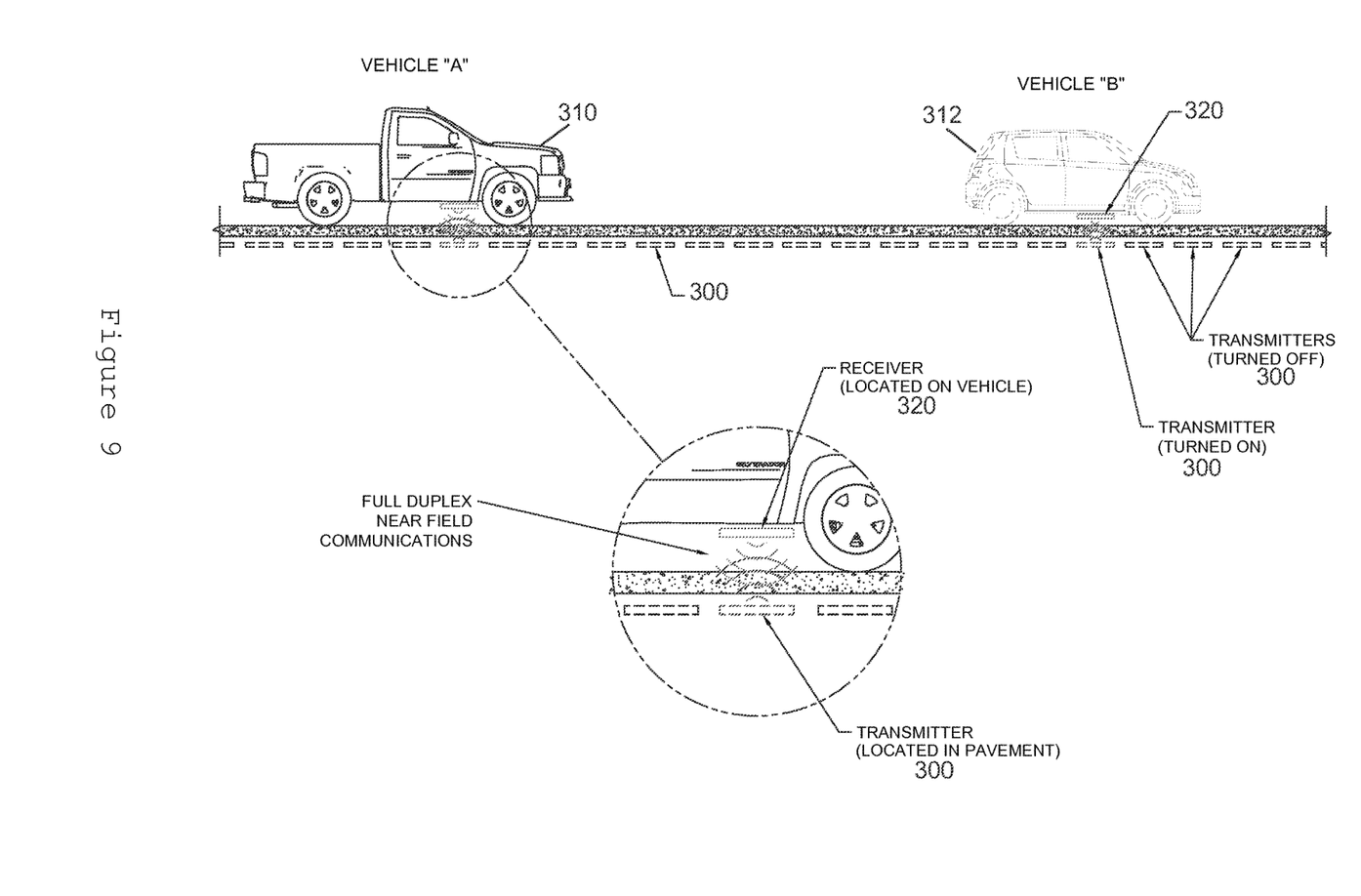
FIG. 9 illustrates an embodiment of dynamic charging using the communications methodology described herein.

Dynamic electric vehicle charging is a specialized case of providing electrical energy to an electrically powered vehicle while the vehicle is in motion. As illustrated in FIG. 9, the use of dynamic charging may be accomplished using resonant magnetic induction in which a plurality of independent transmitters 300 are installed in a roadway in a linear array and energized in a controlled sequence as a target vehicle 310, 312 travels above the linear array 300. Dynamic charging may be implemented when there is just one vehicle 310 moving over the array of transmitters 300, or in the more realistic circumstance, when there are multiple electric vehicles 310, 312 of differing types, velocities, and power requirements moving over the array of transmitters 300. In the latter case, the sequencing of the energization of specific transmitters 300 will be variable within the array and will depend on the various vehicle types and their motion, factors which are inherently unpredictable. Thus, the technology requirements of dynamic charging pose special technical challenges. The system described above solves the multiple problems of dynamic charging as enumerated below.

The most acute problem for dynamic charging is the need for vehicle-to-ground and ground-to-vehicle communications, where discrete, high speed, highly discriminatory and reliable data must be transferred as a requirement for commanding and controlling the charging system. This data is required to operate the charging system in the case of one or several vehicles that may traverse a serial array of ground-embedded inductive power transmitters.

As shown in FIG. 9, an array of inductive power transmitters 300 is installed below a roadway, each transmitter 300 placed in a serial array along the longitudinal axis of the roadway. The intent is to provide a length of roadway that, when driven over by an electrically powered vehicle 310, 312, can supply electrical energy to the vehicle 310, 312 traveling over the linear array of inductive transmitters 300. It is desirable that only the transmitters 300 that are directly underneath the vehicle receiver be energized. The transmitters 300 that do not have a vehicle above them should remain inert (i.e., not energized).

In every instance of inductive power transmission, whether in the dynamic charging mode described here, or in the simpler case of stationary charging described above where a vehicle that is equipped with a single power receiver is parked and remains immobile above a single power transmitter that is embedded in the pavement, communication between the vehicle-based receiver and the ground-based transmitter must occur. This is desirable for vehicle identification, billing for energy purchases, regulating current and voltage, resonant frequency, vertical gap separation distance, primary-to-secondary alignment, and for other purposes, such as safe operations and emergency power cut-off. This is also true in the case of a moving vehicle that is charging while it is in motion, except that the single transmitter built into the vehicle communicates with a plurality of independent transmitters in sequence. This moving one-to-one relationship imposes very significant communications challenges.

The method of operation for charging a moving vehicle is to have each independent transmitter 300 in the linear array energize to create a resonant magnetic field in a sequential pattern as the vehicle receiver 320 passes over each independent transmitter 300. The type of vehicle, its specific charging requirements, its velocity, alignment with respect to the transmitter 300, and its predicted trajectory are all important factors that make this problem difficult to solve.

As depicted in FIG. 9, it is certain to be the case that an array of pavement-embedded transmitters 300 will experience the presence of two or more vehicles 310, 312 simultaneously and respond to the variable conditions of each vehicle 310, 312. In this case, communications between each vehicle 310, 312 and the specific ground transmitter 300 over which it is positioned is discrete and discriminatory so that no other vehicle 310, 312 is confused or data transmissions from a nearby vehicle 310, 312 are received and misread. The requirements for this include that the data communications system be proximally constrained to the target area of the intended vehicle 310, 312. By comparison, broadcast radio and other systems such as Wi-Fi have a range that can easily be received by many nearby vehicles.

The first requirement is to have a highly proximal send-receive capability that is limited to less than 2 meters. (A vehicle moving at 60 MPH travels 88 feet per second. The time of exposure of the receiver to the transmitter may be on the order of 0.02 seconds. In this timeframe, a time delay in the signal transmission typical of digital communications systems of 0.04 to 0.07 seconds is clearly untenable).

The second requirement is to have no or very low time delay (or latency) in the signal. This is required because the vehicles 310, 312 may be moving at high rates of speed over the plurality of transmitters 300, and discrete communications between the onboard receiver 320 and any one transmitter 300 should be assured.

The third requirement is for the communications system to be able to "hand-off" or sequence the communications to the sequenced array of transmitters 300. This can be done by wiring the transmitters 300 to each other, or by allowing one transmitter 300 to communicate using the present invention near field communication system to address the adjacent transmitter 300 in the sequenced array.

The fourth requirement is for full duplex operation, or bidirectionality, so as to assure that in the very short time span that the vehicle 310, 312 is present over the transmitter 300, data may be exchanged in both directions—from the vehicle to the ground, and from the ground to the vehicle.

The fifth requirement is to allow uninterrupted communications under all weather and environmental conditions. This is accomplished by using magnetic energy, as described herein, which allows communication through bodies of water, snow, ice, and other inclement road surface conditions.

The sixth requirement is to avoid the problem of multiple antennas that are distal to the vehicle 310, 312. Multiple distal antennas introduce significant problems due to road pavement and vehicle body interference, such as multipath signal nullification. High reliability vehicle identification with multiple antennas is difficult to secure to avoid malicious hacking or other cyber-vandalism.

Those skilled in the art will appreciate that the communication system described herein offers a uniform solution to each of these requirements.

As noted above, dynamic charging allows moving vehicles to be charged while driving as the vehicles 310, 312 pass over transmitters 300 in the roadway. Each transmitter 300 is energized in a controlled sequence as it anticipates the presence of a vehicle 310, 312 above it. Since the vehicle receiver 320 is only "present" above any one charging station for a short time, a sequencing system is needed that knows where the vehicle's receiver and the charging station's transmitter are in relation to each other in real-time. Ideally, a pre-sequence firing procedure effectively establishes a traveling wave of magnetic energy that moves at the same rate as the vehicle receiver 320. In order to do this, a communication system with minimal latency, such as that described herein, is needed. As noted above, the communication system described herein is very fast (near-zero latency) and very proximal, so that where the receiver 320 is relative to a transmitter 300 is known. Thus, to enable dynamic charging, a series of charging stations equipped with the communications system described herein is provided. During operation, each charging station and/or vehicle transmitter provides information including, for example, vehicle identification, billing for energy purchases, regulating current and voltage, resonant frequency, vertical gap separation distance, primary-to-secondary alignment, and for other purposes, such as safe operations and emergency power cut-off, location, timing, trajectory, and/or speed information regarding the vehicle 310, 312 to the next transmitter so that the next transmitter fires when the vehicle's wireless charging receiver 320 is positioned over the transmitter 300 during travel.

Those skilled in the art will appreciate that the topology and circuit implementation methodology described herein enables effective realization as a single application specific integrated circuit. Further, while the disclosure contained herein pertains to the provision of electrical power to vehicles, it should be understood that this is only one of many possible applications, and other embodiments including non-vehicular applications are possible. For example, those skilled in the art will appreciate that there are numerous applications of providing a full duplex data link in non-vehicle inductive charging applications such as portable consumer electronic device chargers, such as those (e.g., PowerMat™) used to charge toothbrushes, cellular telephones, and other devices. In addition, those skilled in the art will appreciate that the transmission bandwidth (data rate) of the communications system described herein may be increased using simultaneous amplitude and angle modulation using other complex modulation methods and by use of multiple modulated forward and reverse path carriers. Accordingly, these and other such applications are included within the scope of the following claims.

What is claimed:

1. A full duplex data communication system employing near field inductive transmission, comprising:
   a first transmit/receive system that transmits a first signal over a first inductive link and receives a second signal over a second inductive link; and
   a second transmit/receive system that receives the first signal over the first inductive link and transmits the second signal over the second inductive link,
   wherein said second signals are derived from said first signals and said first and second signals are frequency coherent.

2. A system as in claim 1, wherein said first and second signals are frequency synchronized and frequencies of the first and second signals are related by a ratio M/N where M and N are both integers.

3. A system as in claim 2, wherein said first and second signals have an integer harmonic relationship with each other, where the integer is not equal to 1.

4. A system as in claim 3, wherein said first transmit/receive system comprises a harmonic cancellation circuit that cancels integer harmonics of said first signal at a frequency of said second signal to avoid self-interference between said first and second signals.

5. A system as in claim 4, wherein said harmonic cancellation circuit comprises a walking ring counter clocked at an integer multiple of a first frequency and a pair of logic gates that decodes the walking ring counter to produce a rectangular wave that drives a first transmit antenna of said first transmit/receive system.

6. A system as in claim 5, wherein said harmonic cancellation circuit further comprises a resonating capacitor and radio frequency chokes connected to a voltage source, said radio frequency chokes and resonating capacitor combining with an inductance of said first transmit antenna to form a resonant circuit that provides suppression of integer harmonics of said first frequency.

7. A system as in claim 3, wherein said first transmit/receive system comprises a synchronous detector that synchronously detects said second signal.

8. A system as in claim 7, wherein said first transmit/receive system comprises a synchronous detection reference signal generator comprising a frequency multiplier that multiplies a frequency of said first signal by said integer and a phase shifter controlled by quadrature channel phase detection and phase lock loop control from an output of said synchronous detector.

9. A system as in claim 8, wherein said first transmit/receive system further comprises a level detection circuit responsive to an output of said synchronous detector to extract amplitude modulated data using amplitude level detection of the synchronously detected second signal, said level detection circuit including a full wave precision amplifier that receives said synchronously detected second signal and provides an output to a peak hold capacitor that holds a maximum detected voltage level output of said full wave precision amplifier to a constant value using a control signal from an automatic gain control circuit set to a reference voltage.

10. A system as in claim 9, wherein said level detection circuit further comprises a carrier detection voltage comparator that compares the output of said synchronous detector to a percentage of the reference voltage to determine if a carrier is present in the output of said synchronous detector.

11. A system as in claim 7, wherein said synchronous detector comprises coherent but not phase synchronized I and Q detection channels where a detected amplitude of the received second signal is a root mean square of the I and Q channels and a phase angle of the received second signal is an arctangent of a ratio of the I and Q channels.

12. A system as in claim 1, wherein the first and second signals transmitted over said first and second inductive links are modulated with data for the operation of a transponder based communications link that controls a wireless inductive power transfer system.

13. A system as in claim 12, wherein said first and second transmit/receive systems each comprise an amplitude shift modulator that modulates said data for the operation of the transponder based communications link to generate a rectangular wave transmission waveform with Fourier series coefficients selected to give intrinsic integer harmonic rejection so as to suppress coherent transponder harmonic self-interference between said first and second signals.

14. A system as in claim 13, wherein said Fourier series coefficients $\beta_n$ are given by:

$$\beta_n = \frac{4\sin\frac{n}{3}\pi \sin\frac{n}{2}\pi}{n\pi}$$

for each coefficient n.

15. A system as in claim 13, wherein said amplitude shift modulator encodes logic one bits as full signal amplitude of a supply voltage and encodes logic zero bits as one half of the full signal amplitude of the supply voltage.

16. A system as in claim 12, wherein said first and second transmit/receive systems each comprise a phase or frequency modulator that modulates said data for the operation of the transponder based communications link.

17. A system as in claim 12, wherein said first transmit/receive system is on a ground side and said second transmit/receive system is on a vehicle side of a wireless inductive power transfer system for wirelessly charging a vehicle, and wherein said first and second signals have carrier frequencies sufficiently low such that the wavelengths of said carrier frequencies are larger than a distance between a conductive underbody of the vehicle and a surface of the ground such that the vehicle underbody and the surface of the ground function as a waveguide below a waveguide propagation cutoff frequency.

18. A system as in claim 17, wherein at least one of said first and second inductive links is multiplexed onto wireless power transfer coils.

19. A system as in claim 17, wherein said first transmit/receive system comprises a first transmit antenna and a first receive antenna and said second transmit/receive system comprises a second transmit antenna and a second receive antenna, and wherein said vehicle conductive underbody and the surface of the ground contain the first and second signals within an immediate vicinity of the first and second transmit antennas.

20. A system as in claim 19, wherein each of said first and second transmit and receive antennas are smaller than a wavelength of said carrier frequencies whereby when the first transmit antenna and second receive antenna and second transmit antenna and first receive antenna are in close physical proximity the first transmit antenna and second receive antenna and second transmit antenna and first receive antenna respectively have sufficient mutual magnetic field coupling that enables both forward and reverse communications paths between the first and second transmit/receive systems without significant free space propagation.

21. A system as in claim 19, wherein said first transmit antenna and said first receive antenna are consolidated into a single loop antenna having an antenna duplexer that separates and forwards the first and second signals.

22. A system as in claim 21, further comprising a frequency multiplexing circuit that discriminates signals in said first and second inductive links and an electronic signal cancellation circuit functionally disposed between said single loop antenna and a receiver of said first transmit/receive system.

23. A system as in claim 22, wherein said electronic signal cancellation circuit comprises a splitter connected to said single loop antenna so as to receive a signal to be canceled, said splitter providing a first output of said splitter to a first input of a mixer and a sample of the signal to be canceled is provided to a phase shifter and an output of said phase shifter is provided to a second input of said mixer, wherein an output of said mixer is provided to a control input of said phase shifter to create a phase locked loop to ensure that a signal at said first input of the mixer is 90 degrees out of phase with a signal at said second input of the mixer.

24. A system as in claim 23, wherein a second output of said splitter is provided to an amplitude control loop and the output of said phase shifter is provided to a 90 degree phase shifter to create a 180 degree out-of-phase version of the signal to be canceled for combination with the second output of said splitter at a signal combiner.

25. A system as in claim 1, wherein said first transmit/receive system comprises a first modulator that generates said first signal, a synchronous detector, a reference oscillator that provides a modulating signal at a first frequency to said first modulator, and a frequency multiplier that multiplies the first frequency of said modulating signal by an integer for application to said synchronous detector.

26. A system as in claim 25, wherein said second transmit/receive system comprises a homodyne detector that synchronous detects and full-wave rectifies said first signal, a frequency multiplier that multiplies the received first frequency of the modulating signal by said integer, and a second modulator that generates said second signal at a second frequency that is said integer multiple of said first frequency.

27. A system as in claim 26, wherein said first frequency is 13.56 MHz and said second frequency is 40.68 MHz.

28. A system as in claim 1, wherein said second transmit/receive system comprises a variable gain controlled amplifier that increases a signal amplitude of the first signal received over the first inductive link and a limiting amplifier that removes received signal amplitude variations from an output of said variable gain controller amplifier, an output of said limiting amplifier indicating an instantaneous polarity of the first signal received over the first inductive link.

29. A system as in claim 28, further comprising a multiplicative mixer that receives the output of said variable gain controlled amplifier at a first input and the output of the limiting amplifier at a second input, an output of said multiplicative mixer providing a full wave rectification of the first signal received over the first inductive link.

30. A system as in claim 29, further comprising a level detection circuit responsive to an output of said multiplicative mixer to extract amplitude modulated data using amplitude level detection from said full wave rectification of the first signal received over the first inductive link and to provide a control signal to an automatic gain control circuit that provides a feedback control signal to said variable gain controlled amplifier.

31. A method of providing full duplex data communication employing near field inductive transmission between a first transmit/receive system and a second transmit/receive system, comprising the steps of:
the first transmit/receive system transmitting a first signal over a first inductive link;
the second transmit/receive system receiving the first signal over the first inductive link;
the second transmit/receive system transmitting a second signal over a second inductive link; and
the first transmit/receive system receiving the second signal over the second inductive link,
wherein said second signals are derived from said first signals and said first and second signals are frequency coherent.

32. The method as in claim 31, further comprising frequency synchronizing said first and second signals and relating frequencies of the first and second signals by a ratio M/N where M and N are both integers.

33. The method as in claim 32, wherein said first and second signals have an integer harmonic relationship with each other, where the integer is not equal to 1.

34. The method as in claim 33, further comprising cancelling integer harmonics of said first signal at a frequency of said second signal to avoid self-interference between said first and second signals.

35. The method as in claim 31, further comprising modulating the first and second signals transmitted over said first and second inductive links with data for the operation of a transponder based communications link that controls a wireless inductive power transfer system.

36. The method as in claim 35, wherein said modulating comprises amplitude modulating said data for the operation of the transponder based communications link to generate a rectangular wave transmission waveform with Fourier series coefficients selected to give intrinsic integer harmonic rejection so as to suppress coherent transponder harmonic self-interference between said first and second signals.

37. The method as in claim 36, wherein said Fourier series coefficients $\beta_n$ are given by:

$$\beta_n = \frac{4\sin\frac{n}{3}\pi \sin\frac{n}{2}\pi}{n\pi}$$

for each coefficient n.

38. The method as in claim 36, further comprising encoding logic one bits as full signal amplitude of a supply voltage and encoding logic zero bits as one half of the full signal amplitude of the supply voltage.

39. The method as in claim 35, wherein said first transmit/receive system is on a ground side and said second transmit/receive system is on a vehicle side of said wireless inductive power transfer system and is adapted to wirelessly charge a vehicle, further comprising providing said first and second signals with carrier frequencies sufficiently low such that the wavelengths of said carrier frequencies are larger than a distance between a conductive underbody of the vehicle and a surface of the ground such that the vehicle underbody and the surface of the ground function as a waveguide below a waveguide propagation cutoff frequency.

40. The method as in claim 39, further comprising multiplexing at least one of said first and second inductive links onto wireless power transfer coils.

41. The method as in claim 35, wherein modulating the first and second signals comprises modulating said first and second signals with data using both amplitude and angle modulation.

42. A method of wireless charging a vehicle using a wireless inductive power transfer system, comprising:
establishing a full duplex communication link between said vehicle and a charging transmitter, said full duplex communication link employing near field inductive transmission between a first transmit/receive system at said charging transmitter and a second transmit/receive system on said vehicle, comprising the steps of:
the first transmit/receive system transmitting a first signal over a first inductive link,
the second transmit/receive system receiving the first signal over the first inductive link,
the second transmit/receive system transmitting a second signal over a second inductive link, and
the first transmit/receive system receiving the second signal over the second inductive link, wherein said second signals are derived from said first signals and said first and second signals are frequency coherent; and
controlling wireless power transfer between said charging transmitter and said vehicle by sending control signals over said full-duplex communication link.

43. The method as in claim 42, further comprising frequency synchronizing said first and second signals and relating frequencies of the first and second signals by a ratio M/N where M and N are both integers.

44. The method as in claim 43, wherein said first and second signals have an integer harmonic relationship with each other, where the integer is not equal to 1.

45. The method as in claim 42, further comprising detecting a change caused by an overhead vehicle in impedance or mutual impedance between isolated electromagnetic elements of at least one of a wireless power transfer coil, alignment coils, and a near field communications antenna of the charging transmitter and initiating transmission of said control signals over said first inducting link when said change is detected.

46. The method of claim 42, wherein said wireless inductive power transfer system includes a plurality of charging transmitters installed in a roadway, further comprising:
said charging transmitter and/or a vehicle transmitter providing at least one of location, timing, and speed information regarding the vehicle to a second charging transmitter;
said second charging transmitter using said at least one of location, timing, and speed information to determine a time when a wireless charging receiving device of the vehicle will be positioned over the second charging transmitter; and
said second charging transmitter providing wireless power transfer at the determined time to provide wireless power transfer to the vehicle; whereby the vehicle is charged as the vehicle passes over said plurality of charging transmitters.

47. The method as in claim 46, further comprising establishing a pre-sequence firing procedure to establish a traveling wave of magnetic energy that moves at the same rate as the wireless charging receiving device of the vehicle.

* * * * *

UNITED STATES PATENT AND TRADEMARK OFFICE
CERTIFICATE OF CORRECTION

PATENT NO. : 10,135,496 B2
APPLICATION NO. : 15/508611
DATED : November 20, 2018
INVENTOR(S) : Long et al.

Page 1 of 1

It is certified that error appears in the above-identified patent and that said Letters Patent is hereby corrected as shown below:

In the Claims

In Column 18, Line 59, in Claim 46, delete "vehicle;" and insert --vehicle,-- therefor Signed and Sealed this
Twenty-eighth Day of May, 2019

Andrei Iancu
*Director of the United States Patent and Trademark Office*